United States Patent
Foster

(10) Patent No.: US 7,616,201 B2
(45) Date of Patent: Nov. 10, 2009

(54) CASTING SHADOWS

(75) Inventor: Mason J. Foster, Walnut Creek, CA (US)

(73) Assignee: Autodesk, Inc., San Rafael, CA (US)

( * ) Notice: Subject to any disclaimer, the term of this patent is extended or adjusted under 35 U.S.C. 154(b) by 289 days.

(21) Appl. No.: 11/286,658

(22) Filed: Nov. 23, 2005

(65) Prior Publication Data

US 2007/0115283 A1 May 24, 2007

(51) Int. Cl.
*G06T 11/00* (2006.01)
(52) U.S. Cl. ............................................. 345/426
(58) Field of Classification Search .................. None
See application file for complete search history.

(56) References Cited

U.S. PATENT DOCUMENTS

| | | | | |
|---|---|---|---|---|
| 5,982,383 | A * | 11/1999 | Kumar et al. | 345/440 |
| 6,628,279 | B1 * | 9/2003 | Schell et al. | 345/420 |
| 7,360,175 | B2 * | 4/2008 | Gardner et al. | 715/854 |
| 2002/0102989 | A1 * | 8/2002 | Calvert et al. | 455/456 |
| 2003/0058241 | A1 * | 3/2003 | Hsu | 345/426 |
| 2005/0166138 | A1 * | 7/2005 | Kundu | 715/501.1 |
| 2005/0190181 | A1 * | 9/2005 | Sakagawa et al. | 345/419 |

FOREIGN PATENT DOCUMENTS

EP 1189176 A2 * 3/2002

OTHER PUBLICATIONS

Adobe Creative Team, "Adobe Photoshop 6.0 Classroom in a Book," Dec. 28, 2000, Adobe Press, chapter 3.*
Shadow Caster User's Guide, Sophisticated Drop Shadows and Effects for QuarkXPress, Copyright 2005, 37 pages.
SketchUp for Microsoft Windows User Guide, www.sketchup.com, pp. 38-40, 71, 251-252, 324, 364, (2005).
Reeves, W. et al., "Rendering Antialiased Shadows with Depth Maps," Computer Graphics, 21(4):283-291, Jul. 1987.

* cited by examiner

*Primary Examiner*—Ulka Chauhan
*Assistant Examiner*—Andrew Yang
(74) *Attorney, Agent, or Firm*—Gates & Cooper LLP

(57) ABSTRACT

A method, apparatus, and article of manufacture are configured to cast a shadow for a two-dimensional vector geometry. A two-dimensional computer-generated rendering comprised of vector geometry is obtained. A face of the vector geometry is then selected and a virtual height is assigned to the face. Once a location of a virtual light source is defined, a shadow for the vector geometry is created and displayed based on the virtual height of the face and the location of the virtual light source.

18 Claims, 6 Drawing Sheets

CASTING SHADOWS

CROSS-REFERENCE TO RELATED APPLICATIONS

This application is related to the following co-pending and commonly-assigned patent application, which application is incorporated by reference herein:

U.S. patent application Ser. No. 11/268,797, entitled "AUTOMATIC ELEMENT SUBSTITUTION IN VECTOR-BASED ILLUSTRATIONS", by Mason J. Foster, filed on Nov. 8, 2005;

U.S. patent application Ser. No. 11/268,796, entitled "DRAWING STYLE DOMAINS", by Mason J. Foster, Jose Madeira de Freitas Garcia, and Joseph Cleveland Ard, filed on Nov. 8, 2005; and U.S. patent application Ser. No. 11/286,535, entitled "STROKED FILL", by Nikolai Sander and Mason J. Foster, filed on the same date herewith.

BACKGROUND OF THE INVENTION

1. Field of the Invention.

The present invention relates generally to architectural renderings, and in particular, to a method, apparatus, and article of manufacture for displaying/casting a shadow on objects in a two-dimensional architectural rendering.

2. Description of the Related Art.

In the architectural, engineering, and construction (AEC) fields, three-dimensional computer aided design (CAD) drawings are often used to design blueprints, drawings, plans, etc. However, such CAD drawings may be complex, confusing, and fail to provide an end-user (e.g., a potential client) with a drawing or visualization of the "intent" of the architect or designer. Architectural renderings are designed to illustrate the "intent" of the designer or architect in two dimensions, as opposed to three-dimensional renderings having precise fidelity, accurate, hard-lined 3D geometry, lighting and shadows. Further, it is desirable to utilize shadows to provide a more real-world appearance in a two-dimensional drawing/rendering environment. However, in the prior art, shadows were geometrically accurate in a 3D environment, or merely consisted of a dark copy of a particular object that was offset to provide an "outline" type of effect. These disadvantages of the prior art may be better understood with an explanation of drawing programs and prior art techniques for casting/creating shadows.

Three dimensional (3D) drawing programs are often very complex and difficult to use. In addition, such 3D drawing programs typically show realistic/accurate, hard-lined 3D geometry, lighting and shadows. To create a shadow in such a 3D program, a 2D shape may first be drawn. However, prior to creating a shadow, the 2D shape must be converted into a 3D shape (e.g., by extruding the 2D shape). Once the 3D shape has been extruded in a 3D environment, the user can opt to cast a shadow on the 3D shape. It should be noted that throughout the process, the user is working in a 3D drawing program. Further, once the 2D shape is extruded and the 3D shape is created, the 2D shape no longer exists and the user must work with the 3D shape and all of its accompanying complexities. In an alternative prior art 3D embodiment, the user can select and move a shadow. However, the movement of the shadow is limited and the user does not have the flexibility to customize or manipulate the shadow as desired.

As described above, it is desirable to create an architectural rendering that appears hand-drawn similar to the way an artist would work. Such architectural drawings are designed to communicate the intent of the artist. Shadows in architectural renderings follow a particular convention, and are not the geometrically precise shadows that would be generated from a 3D program. Instead, such shadows are cast by flat surfaces at various distances from the camera and light sources. For example, a shadow may merely be an outline or offset darkened copy of the 2D shape.

FIG. 1 illustrates a prior art drawing with a shadow. As illustrated, the square 100 merely has an offset darkened copy 102 of the square as a shadow. Further, the corners of box 100 and shadow 102 are not connected. Accordingly the prior art fails to achieve a concept or sense of depth. To create the shadow illustrated in FIG. 1, the user may merely be presented with an option to display a shadow or the user may select the box 100 that already has the shadow 102 defined for it.

Alternatively, a user could elect to create an effect on a particular layer of a drawing while specifying various parameters for the shadow on the layer (e.g., an angle, distance, intensity, or other attributes). For example, the Shadow-Caster™ product available from A Lowly Apprentice Production provides a method referred to as DropShadow™ that may be used to create a shadow. However, such a drawing program fails to allow the user a mechanism for specifying a single lighting location in a drawing that is used to cast shadows on multiple objects with differing heights. In this regard, such prior art products merely provide for shadows that are cast by a flat surface at a various distance from a camera and light source. Further, as described above, drop shadows are merely shadows that are dropped/displayed beneath an object so that the object appears to hover above the canvas. Accordingly, the shadows do not appear realistic and the corners of the object and shadow are not connected.

In view of the above, what is needed is a mechanism for casting shadows on a flat two-dimensional vector-based drawing (e.g., an architectural rendering such as an elevation view), as if the flat drawing has depth in an easy and efficient manner.

SUMMARY OF THE INVENTION

Embodiments of the invention allow an artist to work in the familiar domains of a two-dimensional architectural rendering (e.g., plan and elevation views) while simultaneously providing controls that introduce an illusion of depth into otherwise flat looking drawings. The illusion of depth is achieved by the creation of cast shadows. The artist may assign virtual height values to any face in a 2D composition through a simple click-and-drag interface. The assigned height values are used to compute a height map for the entire 2D scene. The height map and light source position are used to derive shadow contours in the plane of the drawing. These shadow contours may be included in the screen preview of the drawings as well as the page description that is printed.

In addition, the user is never required to think or work outside of the plane of the 2D drawing. Although the shadow contours are generated by virtual 3D extrusions, the 3D elements are computed in a way that is completely transparent to the user, with the feedback being the extent of the shadow contours in the drawings. Further, the user is never required to work in a 3D interface, and the original 2D drawing elements never require (or receive) any modification. In this regard, the original 2D appearance and draw order are preserved on top of the shadow contours.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a method, apparatus, system, technique, etc. that casts shadows on a two-dimensional vector-based drawing in an easy intuitive interface.

Hardware and Software Environment

Figure 2:
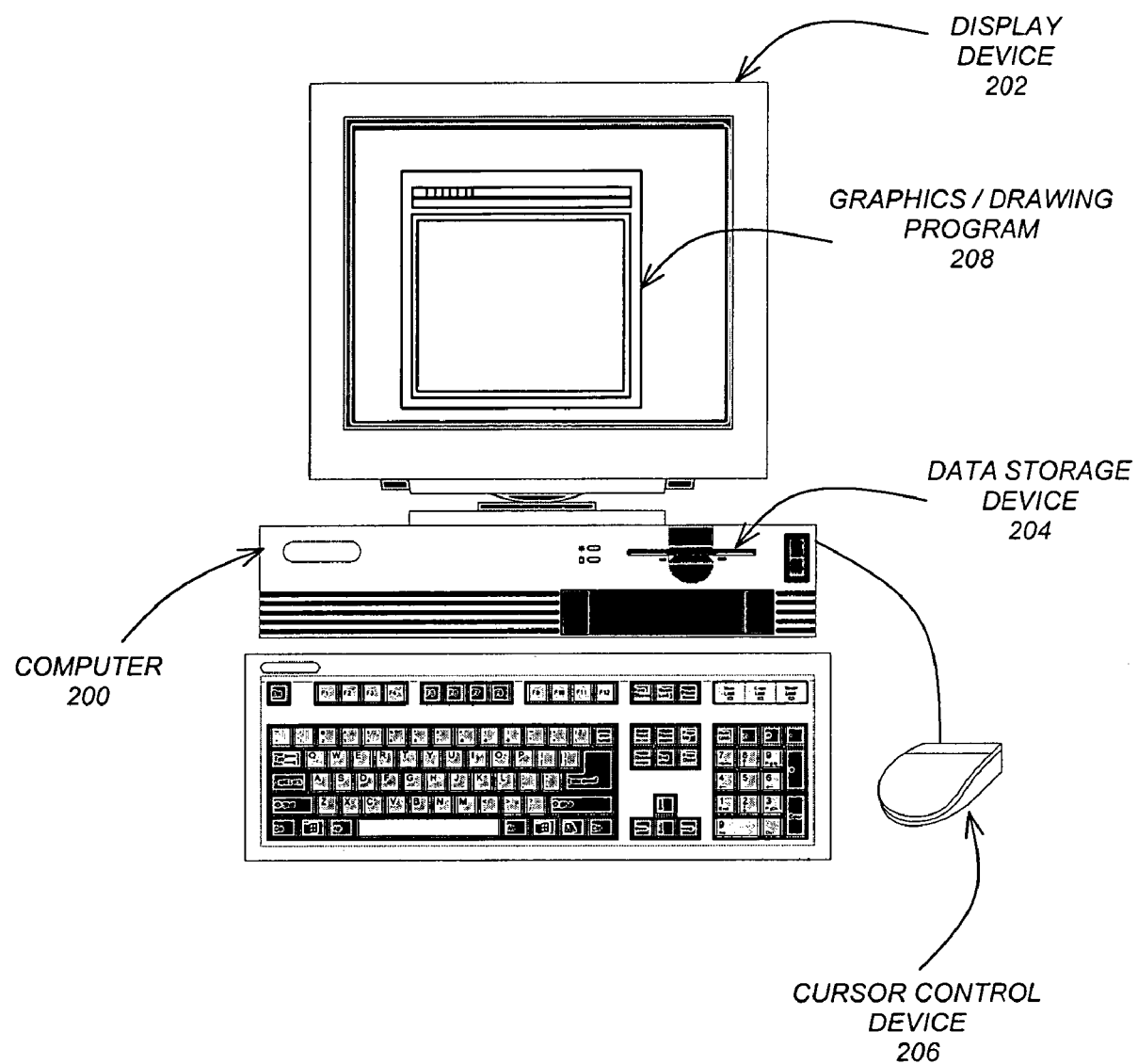
FIG. 2 is an exemplary hardware and software environment used to implement one or more embodiments of the invention.

FIG. 2 is an exemplary hardware and software environment used to implement one or more embodiments of the invention. Embodiments of the invention are typically implemented using a computer 200, which generally includes, inter alia, a display device 202, data storage devices 204, cursor control devices 206, and other devices. Those skilled in the art will recognize that any combination of the above components, or any number of different components, peripherals, and other devices, may be used with the computer 100.

One or more embodiments of the invention are implemented by a computer-implemented graphics program 208, wherein the graphics program 208 is represented by a window displayed on the display device 202. Generally, the graphics program 208 comprises logic and/or data embodied in or readable from a device, media, carrier, or signal, e.g., one or more fixed and/or removable data storage devices 204 connected directly or indirectly to the computer 200, one or more remote devices coupled to the computer 200 via a data communications device, etc.

Those skilled in the art will recognize that the exemplary environment illustrated in FIG. 2 is not intended to limit the present invention. Indeed, those skilled in the art will recognize that other alternative environments may be used without departing from the scope of the present invention.

Rendering Software

In one or more embodiments of the invention, graphics program 208 is an architectural rendering application that provides a two-dimensional vector-based rendering (e.g., hand-drawn, cartoon-like) of a drawing. Another graphics program 208 may consist of a more precise fidelity application such as a CAD application or a three-dimensional drawing application. When using an architectural rendering application 208, a drawing (and its content) may be imported from the precise fidelity application. The architectural rendering application 208 may be enabled to preserve information from the precise fidelity application such as layer information, geometry, objects, views, etc.

As used herein, a drawing may have multiple layers wherein each layer refers to a collection of geometry. In addition, layers can be arranged into (nested) groups for organizational/selection purposes. Sub-layers allow a user to apply different appearance styles to elements on a common layer. If a user selects objects from more than one layer, sub-layers may be automatically created in each of the layers without moving selected objects into a new layer. However, to utilize or apply a style to a layer and/or sub-layer requires a permanent modification on a layer basis and/or to individual objects. Further, there is no transition area to provide for a transition from one sub-layer to another without significant user manipulation and processing.

Style Map

As described above, various styles may be applied to one or more layers. To provide additional flexibility, the invention also enables the user to import or export a style in the form of a style map. A style map is essentially a file that contains the layer/style assignments and all of the relevant style definitions. When a user imports a style map, any layers matching the name of the layers in the imported file receive the corresponding appearance style. Further, all of the styles defined in the imported file may be added to a palette of the styles available to the user (e.g., for subsequent style selection).

Shadows

One or more embodiments of the invention provide for the use of a cast shadow tool that lets the user quickly create shadows by pushing and pulling implicit faces, defined by vector geometry. The tool creates shadows by casting a (perfigure) directional light upon virtually extruded geometry. The shadow that is cast provides the ability to display the darkened shadow beam from the virtually extruded geometry onto other geometry and the canvas of the drawing.

Two modes may be used for creating simulated shadows: (1) a cast shadows mode; and (2) an orient shadows mode. The cast shadows mode is the primary mode for using the tool. The user may select one or more faces defined by lines of vector geometry, then virtually extrude faces by dragging (or click-move-clicking). The orient shadows mode is a temporary mode (e.g., that may be accessed by pressing a key on a keyboard [e.g., the ALT key] or using a cursor control device 206) that allows the user to set the angle and length of a shadow by dragging (or click-move-clicking).

Light Source

Figure 1:
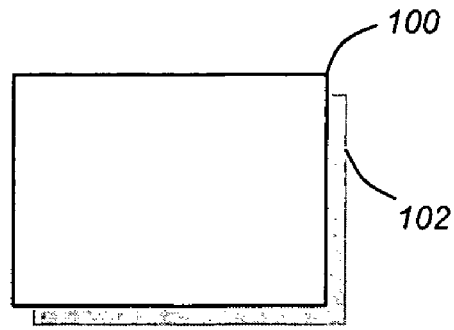
FIG. 1 illustrates a prior art drawing with a shadow.
Figure 3:
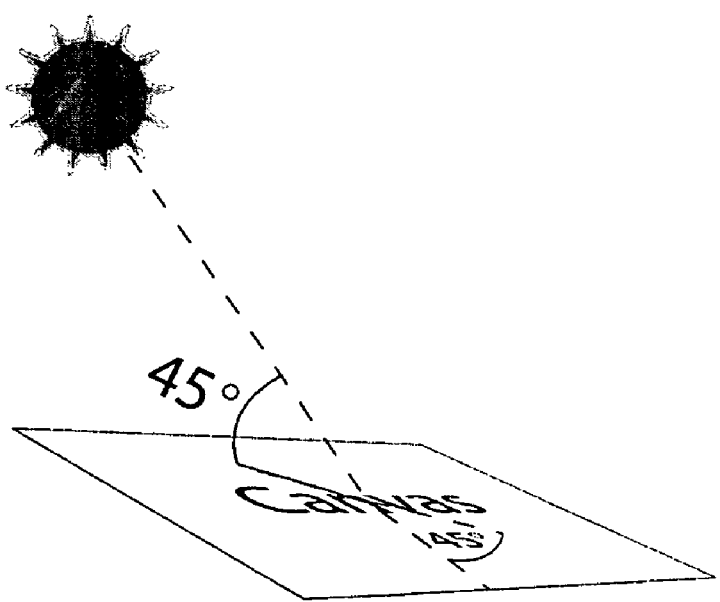
FIG. 3 illustrates the initial settings for a virtual sun in accordance with one or more embodiments of the invention.

The first time the cast shadow tool is used in a drawing, a virtual light source or "virtual sun" is created in the drawing. The virtual light is initially positioned in the top-left corner of the canvas (aiming towards the bottom-right corner) and pointing down at a 45 degree angle to the canvas. FIG. 3 illustrates the initial settings for a virtual sun in accordance with one or more embodiments of the invention. As illustrated in FIG. 3, the virtual sun is oriented at 45 degrees to the XY and YZ planes.

It should be noted that while the initial settings for the light source are illustrated in FIG. 3, the user may change the orientation of the light using the orient shadows mode of the cast shadow tool (described in further detail below). In addition, to provide for a more intuitive and easy-to-use interface, the virtual sun may never be displayed in the viewport/drawing.

Shadow Layer

The first time the cast shadow tool is used in a figure, a "shadows" layer may be created (e.g., in a layers palette). As described above, different styles may be applied on a per layer basis. Accordingly, by default, the shadows layer may be created using the default shadow appearance style (semi-transparent black fill).

The shadows layer (itself) may be similar to other layers in a drawing program such that the shadows layer can be set as the current layer and geometry can be created on or moved to this layer.

The shadows layer is unique in that it can possess the invisible extruded geometry used to create shadows (extruded geometry is described in detail below). In embodiments of the invention, such invisible extruded geometry can never be selected. Further, the draw order of such invisible extruded geometry may be determined on each face's z-value and not on the order of the layers (e.g., in a draw order listing/palette).

All shadows created in a drawing/figure automatically belong to the shadows layer. These shadows are drawn using the appearance style applied to the layer (e.g., the default style is that of semi-transparent black fill). Objects created on (or moved to) the layer receive the same appearance style thereby allowing users to draw custom shadows on the same layer as the cast shadows.

If the user deletes the shadows layer, all shadows are also removed. However, if the user casts shadows again, a new shadows layer is created.

Casting Shadows

Shadows may be cast/created by selecting implicit faces (area enclosed by intersecting lines) and then virtually extruding the face in/from the canvas/drawing.

Face selection may be performed in an easy user-intuitive manner. As the user moves the cursor (e.g., controlled by a cursor control device 206) across the canvas, eligible faces may "highlight." When the user clicks on a face, it is shaded to indicate that it is selected.

Figure 4A:
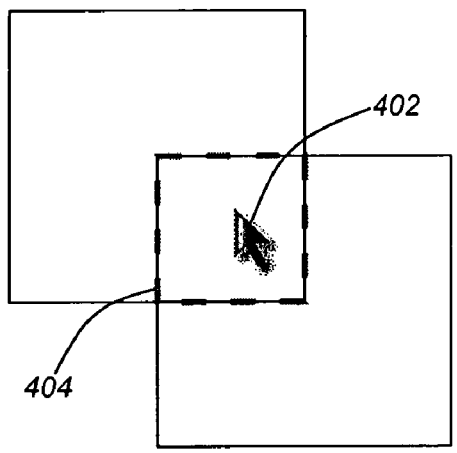
FIGS. 4A-4B illustrate the selection of a face in accordance with one or more embodiments of the invention.
Figure 4B:
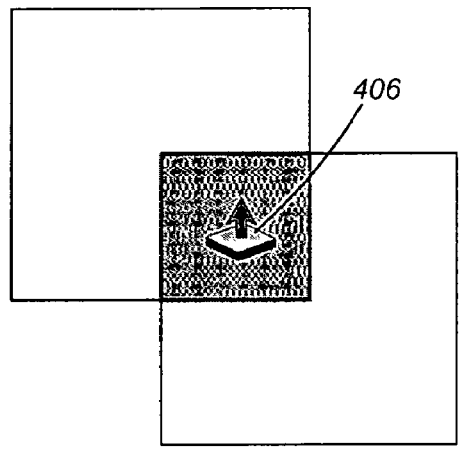

FIGS. 4A-4B illustrate the selection of a face in accordance with one or more embodiments of the invention. Referring to FIG. 4A, when the user rolls the cursor 402 over any enclosed face, the area may be indicated by a dashed highlighted line 404. Once the user clicks in the highlighted region, the region 402 is selected and the cursor 402 changes (when over a selected face) to cursor 406, as illustrated in FIG. 4B, to indicate the user may begin the extrusion process.

Additional faces may be added and removed from the selected set of faces (e.g., using the SHIFT key). For example, the user can SHIFT+click to add faces to the current selection. If the user SHIFT+clicks on an unselected object, the object is added to the selection. Alternatively, if the user SHIFT+clicks on a face that has already been selected, it is removed from the selection set.

The user can save selected faces as a selection set. Further, if the user chooses a selection set (e.g., from a properties palette or listing of selected faces), the faces are selected and the currently active tool may change to the cast shadows tool.

Once the user clicks to define/select a region (or face), the user can click on any selected face to begin to cast a shadow. In this regard, the user casts a shadow by clicking on an already selected face. Such a clicking on a selected face begins the shadow casting process for all currently selected faces. Thus, the user drags (or click-move-clicks) on any selected face to "pull" the selected faces out from the canvas. As the faces are pulled out of the canvas, a virtual extrusion of the selection is created and displayed. Based on the position of the virtual sun, a shadow is automatically cast by the "extruded" geometry. The user has a top-down view and can dynamically view the shadow lengthen and fall on top of other geometry as the geometry is "pulled" further out from the canvas. It should also be noted that in some embodiments, since there is only one virtual sun per drawing/figure, all shadows are cast in the same direction. Further, the corners of the face/extrusion and the shadow may be connected to more accurately resemble a real shadow.

Figure 5A:
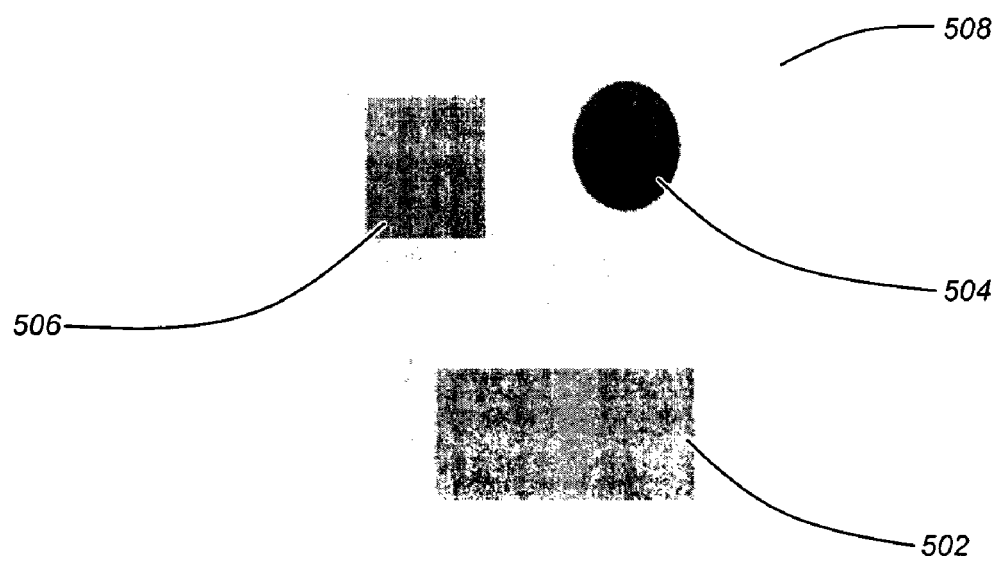
FIGS. 5A-5D illustrate the user interface or display during the process of casting shadows in accordance with one or more embodiments of the invention.

FIGS. 5A-5D illustrate the user interface/display during the process of casting shadows in accordance with one or more embodiments of the invention. FIG. 5A illustrates three pieces of geometry 502-506 on a canvas 508 before any shadow casting has been performed.

The cast shadows tool sets the z-value of selected faces by dragging or click-move-clicking. When the user clicks on any selected face, they can drag or move the cursor/mouse pointer to decrease or increase the "z-value" of the face. Moving the cursor up increases the z-value (raises the geometry), while moving the cursor down decreases the z-value (lowers the geometry).

Figure 5B:
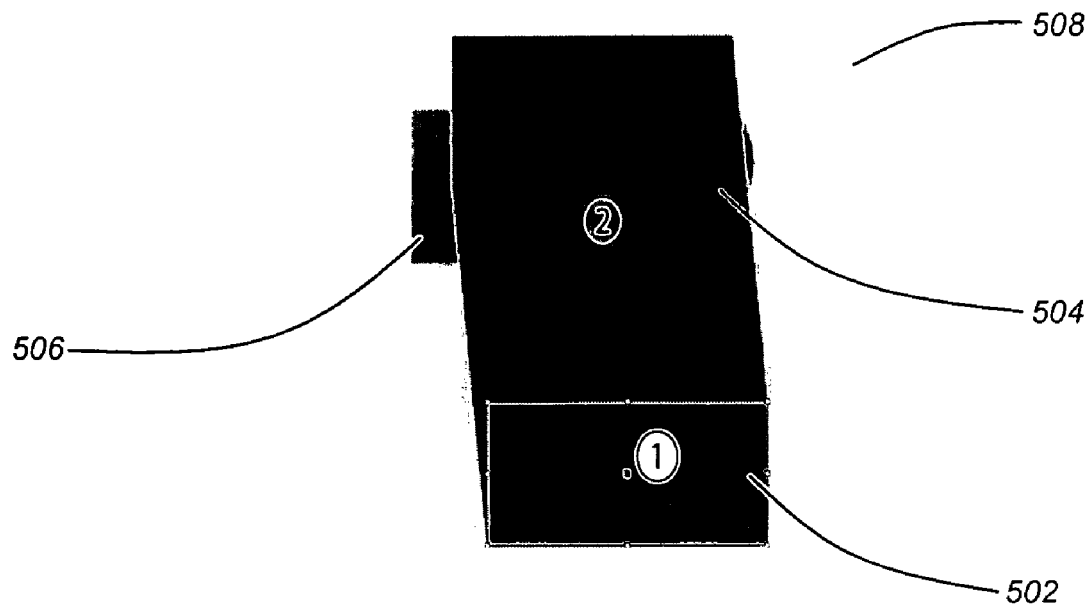

FIG. 5B illustrates the noted points 1 and 2 that can be used to set the z-value. The user may increase the z-value of the rectangle 502 with two clicks. Alternatively, the user can drag and release (at the noted points 1 and 2) to cast the shadow. As illustrated, the user first clicks the rectangle 502 and can then hold down and drag the face to the new location thereby creating the extrusion. Alternatively, the user first clicks on point (2) of the face of rectangle 502, moves the cursor to the desired extrusion location, and clicks the point (1) to specify the z-value.

The user can move the cursor anywhere on the screen. However, only the vertical component of the move may be translated to the z-value. By default, the vertical distance traveled by the cursor defines an addition to the z-value of the selected geometry. Accordingly, the selected geometry may not necessarily all end up with the same z-value. In other words, if multiple faces having different z-values are selected and the cast shadows tool is used to adjust the z-value, the z-value is merely added to the existing z-values for the faces and the tool does not equalize the z-values for all of the faces.

Figure 5C:
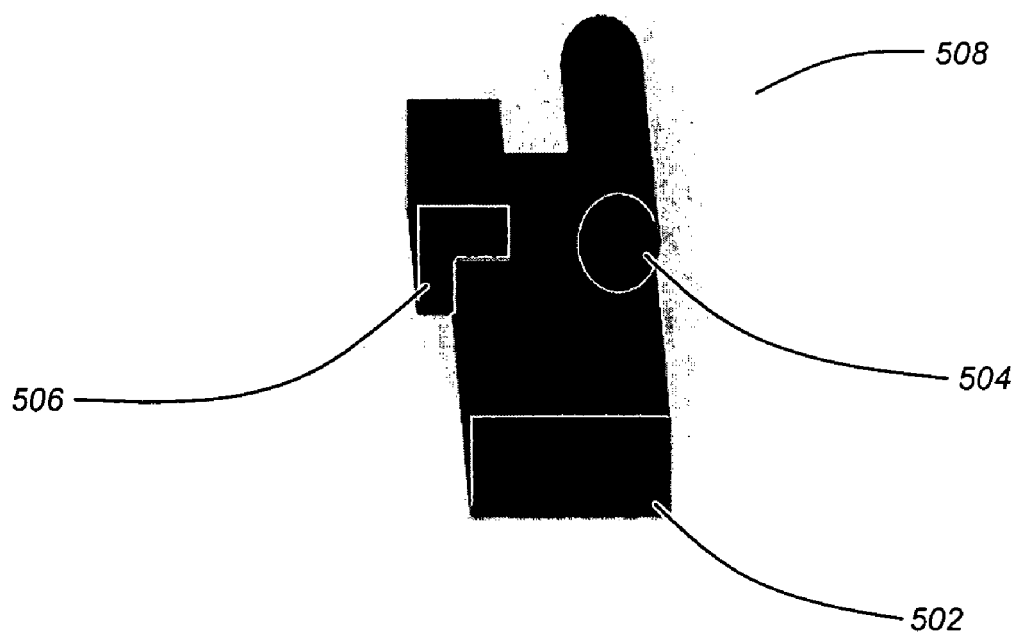
Figure 5D:
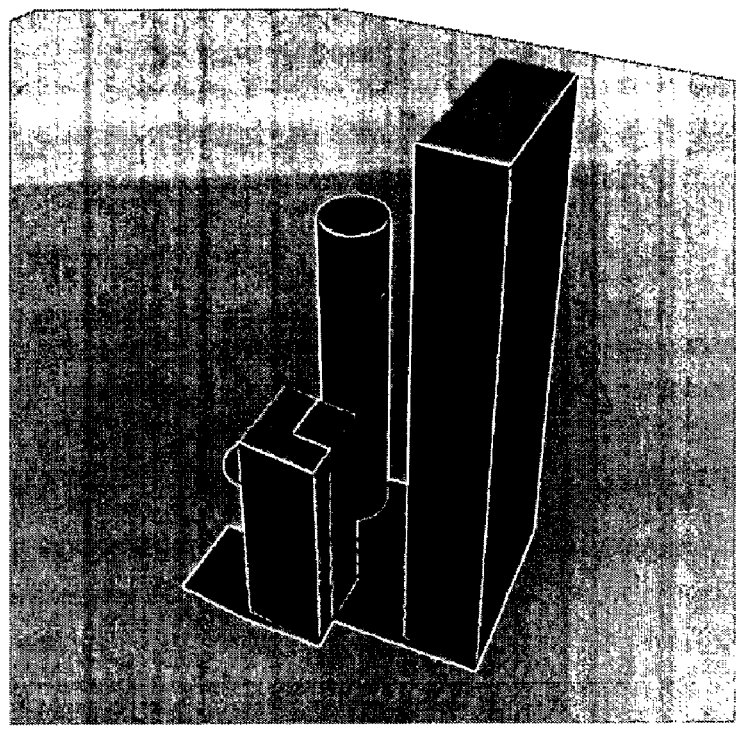

FIG. 5C illustrates various geometric faces 502-506 having different z-values. As illustrated in the simulation of FIG. 5C in FIG. 5D, the shadows may not always fall on top of geometry based on the z-value. Instead, based on the virtual extrusions, various parts or all of the extrusions may be occluded. Accordingly, a portion of square 506 may be occluded by a shadow as illustrated in FIGS. 5C and 5D. An alternative option (e.g., holding the SHIFT key while casting a shadow) provides for equalizing all of the z-values for the selected elements (e.g., the z-values may all be raised to match the top-most object in the selection).

To create the various shadows, the 3D extrusions and height values are only used internally and are not exposed to the end-user. To properly display the various shadows and how they interact with each other, various steps may be performed internally that are not exposed to the end-user. Firstly, shapes/objects/geometry in a drawing may consist of Bezier curves/splines. To create a shadow from such a spline may not be possible. Accordingly, the spline may first be converted to a polyline (i.e., a series of points) and the polyline may be tessellated. The tessellated polyline is then extruded in accordance with the user actions. Each pair of points in the extruded tessellated polyline may be used to produce a beam or plane that makes up the shadow. In this regard, the beam may be viewed as multiple vectors having a direction based on the location of the virtual sun. The combined set of planes may be viewed and manipulated internally as a mesh that comprises the shadow.

Once the mesh has been obtained, the issue becomes how to draw the shadows on the display. Each of the various objects/geometries in the drawing has an associated height value. All of the objects and their respective meshes may be sorted by the height values. The intersections between the mesh (for the highest object) and the various objects and canvases are computed. If the mesh only intersects with the canvas, the appropriate polygon may be displayed as the shadow. Further, if the mesh intersects with the top of another object/geometry, it may be viewed as a mini-canvas and again, the appropriate polygon may be displayed/added to the shadow layer. Such a display may comprise a blending of the shadow with the underlying object/canvas to produce the appropriately appearing display. However, if the mesh intersects with the mesh of another object, a further blending may be produced. Such a blending may produce a darker shadow or the elimination of one of the shadows in the intersection region.

As described above, the first time the cast shadows tool is used in a drawing/figure, a shadows layer and a virtual sun light is created (e.g., at a default location) in the current drawing/figure. Further, there can only be one shadows layer and virtual sun object per drawing/figure. If the cast shadow tool has already been used in the drawing/figure, the shadow is added to the existing shadow layer, and the shadow is cast based on the location of the existing virtual sun (i.e., whose location may differ from the default location due to user actions [see the orient shadows description below]).

It should also be noted that faces are defined by vectors, and not appearance styles applied to vectors. Accordingly, the extruded faces are based on the shape of the underlying vector (and not the appearance style). Further, the edges of the canvas do cast a shadow when a face is moved below the zero-plane. Further, the edges of faces may also be extruded (e.g., to simulate effects such as a pitched roof). Also, if an extruded face shares an edge with another face, the coincident edges may be split into two (and not shared, which would create an angled plane).

In view of the fact that edges cast shadows, islands may also cast shadows (e.g., if the user selects a rectangular face with a circle in the middle, the circle is not selected by default, and a "hole" may be cut in the extruded rectangle).

Further, it should be noted that the display may be automatically updated dynamically in real-time as the user moves the pointer/cursor. In this regard, the shadows are cast automatically and dynamically generated/displayed providing immediate visual feedback.

Online instructions or tooltips may also be displayed that instructs the user how to cast the shadow. For example, a message such as "Click to select faces; click or drag on a selected face to cast a shadow; hold ALT to re-orient the direction and length of shadows" may be displayed when the user enters the cast shadow mode.

Orient Shadows

While the primary mode of the cast shadows tool is to extrude a face from the canvas, orienting the shadow is also a useful mode. The shadow may be oriented using a variety of methods. For example, rather than entering a different mode for the cast shadows tool, the user may separately initiate an orient shadows tool to select such an option from a menu or using keyboard shortcuts.

If using different modes for a single tool, when the cast shadows tool is active, the user can hold the ALT key to temporarily enter the orient shadows mode. In this mode, the user can click-move-click or drag anywhere in the viewport/drawing to set the direction and length of shadows being cast.

In the orient shadows mode, the user is repositioning the virtual sun. After the first click, a line is attached to the cursor/mouse pointer, and the new position of the virtual sun is set by the second click. The angle between the two click points sets the direction of the cast shadows and the distance between the two click points sets the angle of the light cast by the virtual sun (with respect to the canvas). In this regard, two clicks on top of each other position the virtual sun orthogonally to the canvas (i.e., light travels straight down such that no shadows are cast). Similarly, a very long distance positions the virtual sun close to the "horizon" defined by the canvas (i.e., if light travels parallel to the canvas, infinite shadows are cast).

Figure 6:
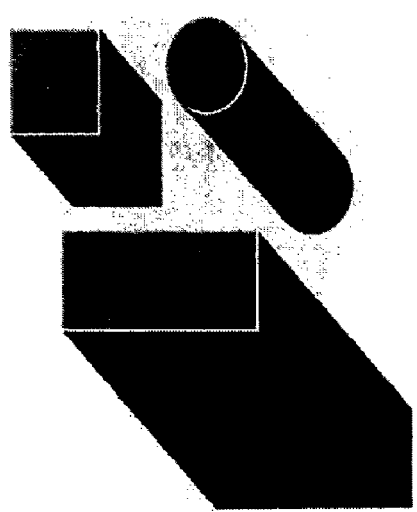
FIG. 6 illustrates the use of the orient shadows mode in accordance with one or more embodiments of the invention.

FIG. 6 illustrates the use of the orient shadows mode in accordance with one or more embodiments of the invention. While FIG. 5C illustrates the original orientation of the shadows, FIG. 6 illustrates the adjusted or new shadow orientation. When the user clicks point 1, a line is attached to the cursor. The click at point 2 establishes/defines the location of the virtual sun. Thus, the angle between points 1 and 2 establishes/defines the direction of the shadows cast. The distance between points 1 and 2 establishes/defines how long the shadows are (e.g., by determining where the sun lies with respect to the canvas/shapes).

Online instructions or tooltips may also be displayed that instructs the user how to orient the shadow. For example, a message such as "Click or drag to define the direction and length of shadows" may be displayed when the user enters the orient shadow mode.

Logical Flow

Figure 7:
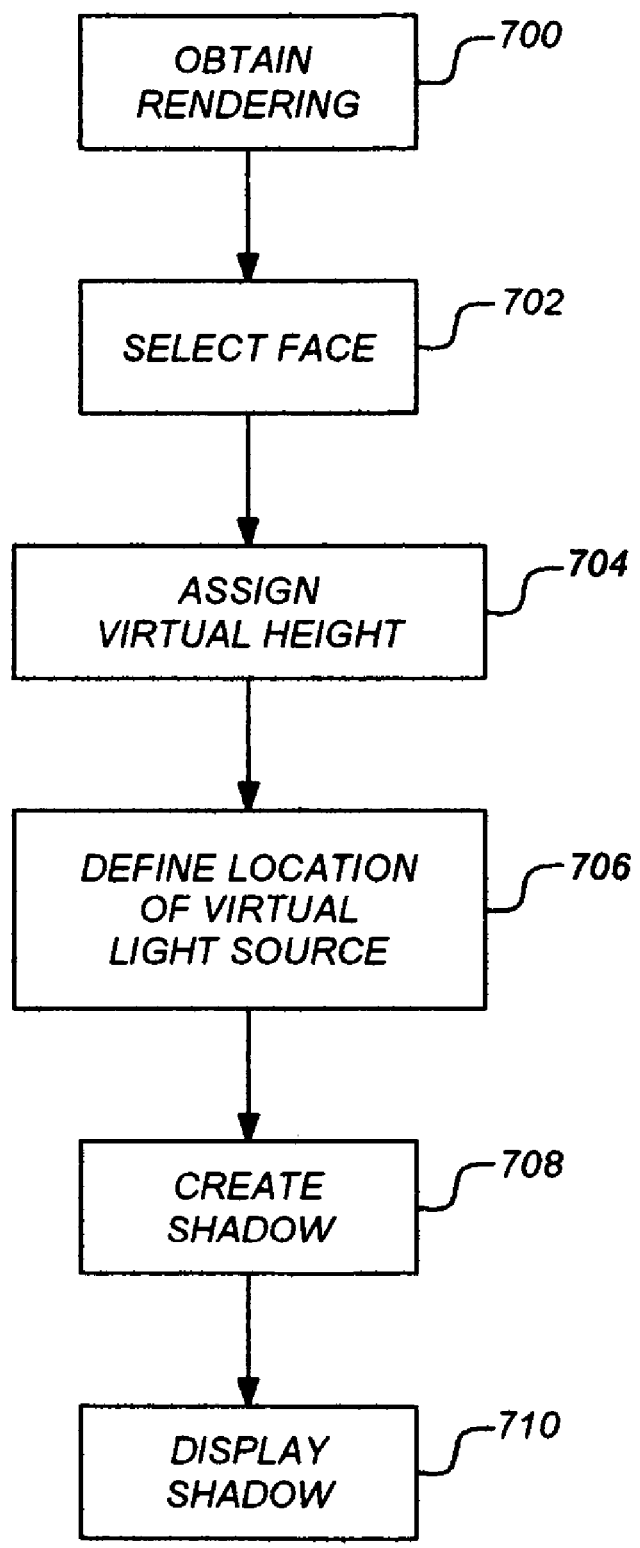
FIG. 7 illustrates the logical flow for casting shadows for a two-dimensional vector geometry in accordance with one or more embodiments of the invention.

FIG. 7 illustrates the logical flow for casting shadows for a two-dimensional vector geometry in accordance with one or more embodiments of the invention. At step 700, a 2D computer-generated rendering comprised of vector geometry is obtained. Such a rendering may be an architectural rendering or other type of 2D vector drawing file.

A face of the vector geometry in the rendering is selected at step 702. As described above, such a selection may consist of highlighting the eligible faces of the vector geometry as the cursor moves across the vector geometry/drawing. The user may then select one of the eligible faces using a cursor control device (e.g., by clicking a mouse button). Multiple faces may also be selected.

At step 704, a virtual height is assigned to the selected face. Such a height may be assigned by the user creating a virtual extrusion of the selected face by pulling the face out of the canvas of the rendering using the cursor control device. The virtual extrusion is displayed to the user as the user is pulling the face and creating the extrusion. The virtual height is assigned based on a z-value/height of the virtual extrusion. In this regard, the vertical movement of the cursor control device determines the virtual height that is assigned to the face.

At step 706, the location of a virtual light source (e.g., sun) is defined. Such a location may be determined interactively by the user through an orient shadows mode of the cast shadow tool. A first location of a cursor upon a first click of a cursor control device button is determined. Once the first location has been determined, a line may be displayed on the screen beginning at the first location. The location of the virtual light source is then defined based on the second location of the cursor upon a second click of the cursor control device. An angle between the first location and the second location defines a direction the shadow will be cast with respect to the canvas of the rendering. Further, the distance of the line (i.e., between the first location and the second location) defines the angle of light that is cast by the virtual light source.

At step 708, a shadow is created that is based on the virtual height of the face and the location of the virtual light source. Such a shadow may be created on a shadow layer of the rendering wherein the appearance style assigned to the layer controls the shadow style. Further, the virtual height information (e.g., the z-value) may also be stored in the shadow layer. The user may not be permitted to edit or select any extrusion, height information, or the shadow from the layer. Instead, the user may only be permitted to edit the shadow using the cast shadow tool which can be used to define the virtual height of the face and define the location of the light source.

At step 710, the shadow is displayed in the rendering. In this regard, the shadow may be automatically and dynamically displayed in real-time as the virtual height is assigned by the user using the cursor control device.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. As described above, a 2D shape is used to simulate a 3D projection. For example, in a 2D architectural rendering, a top down view may be presented with the simulated 3D projection enabling a user to extrude faces or the heights of various buildings or structures in the rendering. Alternatively, if an elevation view of the architectural rendering is displayed, the user can pull windows out from frames or extrude other objects to obtain a height and shadow for the window or other objects.

In view of the above, a rendering engine lets the user interact with the 2D shape and implies a height value based on the interaction. Thereafter, a shadow is applied/created and displayed based on the virtual height information. The user can drag a 2D shape and dynamically view the shadow elongate as the 2D shape is dragged.

The user is also permitted to define a global light source for the 2D rendering. By default, the light source may be assigned to the upper left corner of the rendering at a 45 degree angle. However, the user can reorient the light source using simple click and drag actions of the mouse/cursor control device.

Thus, the invention allows a user to simply and easily cast shadows and provide an appearance of height to a 2D rendering without the complexities of a 3D graphics application. To cast a shadow, the user merely manipulates the height of selected faces without worrying about any of the 3D aspects.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for casting a shadow for a two-dimensional vector geometry, comprising:

(a) obtaining a two-dimensional computer-generated rendering comprised of vector geometry, wherein the vector geometry comprises original two-dimensional drawing elements;

(b) in response to user input selecting a face of the vector geometry, selecting the face of the vector geometry in the computer-generated rendering;

(c) in response to user input interactively identifying a virtual height, assigning the virtual height to the face without modifying the original two-dimensional drawing elements;

(d) in response to user input determining a location of a virtual light source, defining the location of the virtual light source in the computer-generated rendering without modifying the original two-dimensional drawing elements, wherein the defining the location of the virtual light source comprises:

(i) determining a first location of a cursor upon a first click of a cursor control device button; and (ii) defining the location of the virtual light source based on a second location of the cursor upon a second click of the cursor control device button; and wherein:

an angle between the first location and second location defines a direction the shadow will be cast with respect to a canvas of the computer-generated rendering; and a distance between the first location and second location defines an angle of light cast by the virtual light source;

(e) creating a shadow for the vector geometry based on the virtual height of the face and the location of the virtual light source without modifying the original two-dimensional drawing elements; and (f) displaying the shadow in the two-dimensional computer-generated rendering without modifying the original two-dimensional drawing elements.

2. The method of claim 1, wherein:

the shadow is created on a shadow layer of the computer-generated rendering; and the shadow layer further comprises the virtual height.

3. The method of claim 1, wherein the selecting of the face comprises:

highlighting eligible faces of the vector geometry as a cursor moves across the vector geometry; and selecting one of the eligible faces using a cursor control device.

4. The method of claim 1, wherein the assigning the virtual height comprises:

creating a virtual extrusion of the selected face by pulling the face out of a canvas of the computer-generated rendering using a cursor control device;

displaying the virtual extrusion to the user; and assigning the virtual height based on a z-value of a height of the virtual extrusion.

5. The method of claim 1, wherein:

multiple faces are selected;

multiple faces are assigned virtual heights; and multiple shadows are created and displayed for the multiple faces.

6. The method of claim 1, wherein the shadow is automatically displayed dynamically in real-time as the virtual height is assigned by a user using a cursor control device.

7. An apparatus for casting a shadow for a two-dimensional vector geometry in a computer system comprising:

(a) a computer having a memory;

(b) an application executing on the computer, wherein the application is configured to:
  (i) obtain a two-dimensional computer-generated rendering comprised of vector geometry wherein the vector geometry comprises original two-dimensional drawing elements;
  (ii) in response to user input selecting a face of the vector geometry, select the face of the vector geometry in the computer-generated rendering;
  (iii) in response to user input interactively identifying a virtual height, assign the virtual height to the face without modifying the original two-dimensional drawing elements;
  (iv) in response to user input determining a location of a virtual light source, define the location of the virtual light source in the computer-generated rendering without modifying the original two-dimensional drawing elements, wherein the location is defined by:
    (1) determining a first location of a cursor upon a first click of a cursor control device button; and
    (2) defining the location of the virtual light source based on a second location of the cursor upon a second click of the cursor control device button; and
    wherein:
    an angle between the first location and second location defines a direction the shadow will be cast with respect to a canvas of the computer-generated rendering; and
    a distance between the first location and second location defines an angle of light cast by the virtual light source;
  (v) create a shadow for the vector geometry based on the virtual height of the face and the location of the virtual light source without modifying the original two-dimensional drawing elements; and
  (vi) display the shadow in the two-dimensional computer-generated rendering without modifying the original two-dimensional drawing elements.

8. The apparatus of claim 7, wherein:
the shadow is created on a shadow layer of the computer generated-rendering; and
the shadow layer further comprises the virtual height.

9. The apparatus of claim 7, wherein the application is configured to select the face by:
highlighting eligible faces of the vector geometry as a cursor moves across the vector geometry; and
selecting one of the eligible faces using a cursor control device.

10. The apparatus of claim 7, wherein the application is configured to assign the virtual height by:
creating a virtual extrusion of the selected face by pulling the face out of a canvas of the computer-generated rendering using a cursor control device;
displaying the virtual extrusion to the user; and
assigning the virtual height based on a z-value of a height of the virtual extrusion.

11. The apparatus of claim 7, wherein:
multiple faces are selected;
multiple faces are assigned virtual heights; and
multiple shadows are created and displayed for the multiple faces.

12. The apparatus of claim 7, wherein the shadow is automatically displayed dynamically in real-time as the virtual height is assigned by a user using a cursor control device.

13. An article of manufacture comprising a program storage device embodying instructions that, when executed by a computer, cause the computer to perform the method for casting a shadow for a two-dimensional vector geometry, comprising:
  (a) obtaining a two-dimensional computer-generated rendering comprised of vector geometry wherein the vector geometry comprises original two-dimensional drawing elements;
  (b) in response to user input selecting a face of the vector geometry, selecting the face of the vector geometry in the computer-generated rendering;
  (c) in response to user input interactively identifying a virtual height, assigning the virtual height to the face without modifying the original two-dimensional drawing elements;
  (d) in response to user input determining a location of a virtual light source, defining the location of the virtual light source in the computer-generated rendering without modifying the original two-dimensional drawing elements, wherein the location is defined by:
    (i) determining a first location of a cursor upon a first click of a cursor control device button; and
    (ii) defining the location of the virtual light source based on a second location of the cursor upon a second click of the cursor control device button; and wherein:
    an angle between the first location and second location defines a direction the shadow will be cast with respect to a canvas of the computer-generated rendering; and
    a distance between the first location and second location defines an angle of light cast by the virtual light source;
  (e) creating a shadow for the vector geometry based on the virtual height of the face and the location of the virtual light source without modifying the original two-dimensional drawing elements; and
  (f) displaying the shadow in the two-dimensional computer-generated rendering without modifying the original two-dimensional drawing elements.

14. The article of manufacture of claim 13, wherein:
the shadow is created on a shadow layer of the computer-generated rendering; and
the shadow layer further comprises the virtual height.

15. The article of manufacture of claim 13, wherein the selecting of the face comprises:
highlighting eligible faces of the vector geometry as a cursor moves across the vector geometry; and
selecting one of the eligible faces using a cursor control device.

16. The article of manufacture of claim 13, wherein the assigning the virtual height comprises:
creating a virtual extrusion of the selected face by pulling the face out of a canvas of the computer-generated rendering using a cursor control device;
displaying the virtual extrusion to the user; and
assigning the virtual height based on a z-value of a height of the virtual extrusion.

17. The article of manufacture of claim 13, wherein:
multiple faces are selected;
multiple faces are assigned virtual heights; and
multiple shadows are created and displayed for the multiple faces.

18. The article of manufacture of claim 13, wherein the shadow is automatically displayed dynamically in real-time as the virtual height is assigned by a user using a cursor control device.

* * * * *